United States Patent
Strandjord et al.

(10) Patent No.: US 9,587,945 B2
(45) Date of Patent: Mar. 7, 2017

(54) SYMMETRIC THREE-LASER RESONATOR FIBER OPTIC GYROSCOPE

(71) Applicant: Honeywell International Inc., Morristown, NJ (US)

(72) Inventors: Lee K. Strandjord, Tonka Bay, MN (US); Glen A. Sanders, Scottsdale, AZ (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 228 days.

(21) Appl. No.: 14/312,009

(22) Filed: Jun. 23, 2014

(65) Prior Publication Data
US 2015/0369605 A1 Dec. 24, 2015

(51) Int. Cl.
*G01C 19/72* (2006.01)

(52) U.S. Cl.
CPC ......... *G01C 19/727* (2013.01); *G01C 19/721* (2013.01)

(58) Field of Classification Search
CPC ............................ G01C 19/727; G01C 19/721
See application file for complete search history.

(56) References Cited

U.S. PATENT DOCUMENTS

| | | | |
|---|---|---|---|
| 7,463,360 B2 | 12/2008 | Hughes et al. | |
| 7,855,789 B2 | 12/2010 | Strandjord et al. | |
| 7,933,020 B1 | 4/2011 | Strandjord et al. | |
| 8,009,296 B2 | 8/2011 | Sanders et al. | |
| 8,213,019 B2 | 7/2012 | Strandjord et al. | |
| 8,223,341 B2 | 7/2012 | Strandjord et al. | |
| 2007/0133003 A1 | 6/2007 | Sanders et al. | |
| 2014/0044142 A1* | 2/2014 | Strandjord | G01C 19/727 372/32 |
| 2016/0003619 A1 | 1/2016 | Strandjord et al. | |

FOREIGN PATENT DOCUMENTS

| | | |
|---|---|---|
| EP | 2428767 | 3/2012 |
| EP | 2701250 | 2/2014 |

OTHER PUBLICATIONS

European Patent Office, "Extended European Search Report from EP Application No. 15164566.0 mailed Dec. 3, 2015", from Foreign Counterpart of U.S. Appl. No. 14/325,006, filed Dec. 3, 2015, pp. 1-7, Published in: EP.

(Continued)

*Primary Examiner* — Hwa Lee
(74) *Attorney, Agent, or Firm* — Fogg & Powers LLC

(57) ABSTRACT

A resonator fiber optic gyroscope comprises a master laser that emits a reference optical signal, a first slave laser that emits a clockwise optical signal, and a second slave laser that emits a counter-clockwise optical signal. A resonator ring cavity in optical communication with the first slave laser and second slave laser is configured to receive the optical signals from the slave lasers without receiving the reference optical signal. A reflected optical signal from the cavity is directed to a feedback laser stabilization loop for the master laser that includes a common modulation frequency scheme. A frequency of the optical signal from the master laser is indirectly locked onto a resonance frequency of the cavity with a fixed frequency offset, which is determined by a relative frequency between the optical signal of the first slave laser or the second slave laser, and the optical signal of the master laser.

20 Claims, 2 Drawing Sheets

(56) References Cited

OTHER PUBLICATIONS

U.S. Patent and Trademark Office, "Notice of Allowance", from U.S. Appl. No. 14/325,006, filed Feb. 2, 2016, pp. 1-21, Published in: US.

European Patent Office, "Extended European Search Report from EP Application No. 15169969.1 mailed Oct. 26, 2015", from Foreign Counterpart of U.S. Appl. No. 14/312,009, filed Oct. 26, 2015, pp. 1-10, Published in: EP.

\* cited by examiner

SYMMETRIC THREE-LASER RESONATOR FIBER OPTIC GYROSCOPE

BACKGROUND

The resonator fiber optic gyroscope (RFOG) has been developed to meet the needs of many navigation and inertial stabilization markets. The current RFOG designs now being developed involve having at least two laser beams that co-propagate through a rotation sensing coil. Since the two laser beams are at different frequencies and have different modulations applied to them, beat notes generated by the beams mixing on the same photodetector produce a very complex signal spectrum that makes it difficult to detect the desired signal. These complications lead to performance degradation. Furthermore, some designs involve four lasers, which lead to additional complexity.

In some current RFOG implementations, three lasers are employed, including one master laser and two slave lasers. The master laser is stabilized to a reference resonator that is different from the gyroscope resonator. Differential frequency noise between the reference resonator and the gyroscope resonator can limit the RFOG performance. Another disadvantage of this approach is that it requires an additional resonator, thus adding complexity, size, weight, and cost to the RFOG.

Other RFOG implementations combine a component of the master laser light with one of the slave laser beams so that the master can be stabilized to the gyroscope resonator. This eliminates the issues associated with having an independent reference resonator, but introduces the signal complexity issues with having the master and slave lasers mix on the same detector used for resonance tracking and rotation sensing.

Another issue with conventional RFOG designs is that resonance probing in the clockwise direction and the counter-clockwise direction is not symmetric, which can lead to rotation sensing errors.

Accordingly, there is a need to eliminate co-propagating laser beams while maintaining a symmetric RFOG design.

SUMMARY

A resonator fiber optic gyroscope (RFOG) comprises a master laser configured to emit a reference optical signal. A first slave laser is configured to emit a clockwise (CW) optical signal, with the first slave laser operatively coupled to the master laser and responsive to the reference optical signal through a CW optical phase lock loop. A second slave laser is configured to emit a counter-clockwise (CCW) optical signal, with the second slave laser operatively coupled to the master laser and responsive to the reference optical signal through a CCW optical phase lock loop. An optical resonator ring cavity is in optical communication with the first slave laser and the second slave laser, with the optical resonator ring cavity configured to receive the CW optical signal and the CCW optical signal without receiving the reference optical signal. A reflected optical signal from the resonator ring cavity is directed to a feedback laser stabilization loop for the master laser that includes a common modulation frequency scheme. A frequency of the optical signal from the master laser is indirectly locked onto a resonance frequency of the resonator ring cavity with a fixed frequency offset, which is determined by a relative frequency between the optical signal of the first slave laser or the second slave laser, and the optical signal of the master laser.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A symmetric three-laser resonator fiber optic gyroscope (RFOG) is provided in which the optical architecture reduces frequency content in the detected optical signal to improve electrical signal processing. The three-laser RFOG eliminates any co-propagating laser beams and maintains a symmetric design about the clockwise (CW) and counter clockwise (CCW) resonator propagation directions. This is done by employing a master laser and two slave lasers, where the master laser is indirectly locked onto the gyroscope resonator via one of the slave laser beams through a feedback laser stabilization loop. In this way, the master laser beam does not propagate through the gyroscope resonator, and any co-propagating laser beams are eliminated. The present RFOG also eliminates a phase modulator and associated electronics to provide the phase modulation that, in prior devices, is used to modulate the master laser frequency for locking the master laser onto the gyroscope resonator.

Furthermore, since there is only one laser beam in each resonator propagation direction, the resonator resonance probing has a high degree of symmetry between the CW and CCW directions. In addition, the complexity of the beat spectrum is greatly reduced, thereby eliminating the risk associated with complex beat spectrums in detecting a desired signal. This allows significantly more flexibility in choosing modulation frequencies for the three-laser RFOG.

In one embodiment, the three-laser RFOG employs a common cavity modulation, and modulation stripping that removes information of the common modulation in the master laser stabilization feedback loop so that the feedback loop does not remove the effect of the modulation on the resonator output. This eliminates the need for a separate reference resonator.

Further details of the three-laser RFOG are described hereafter with reference to the drawings.

Figure 1:
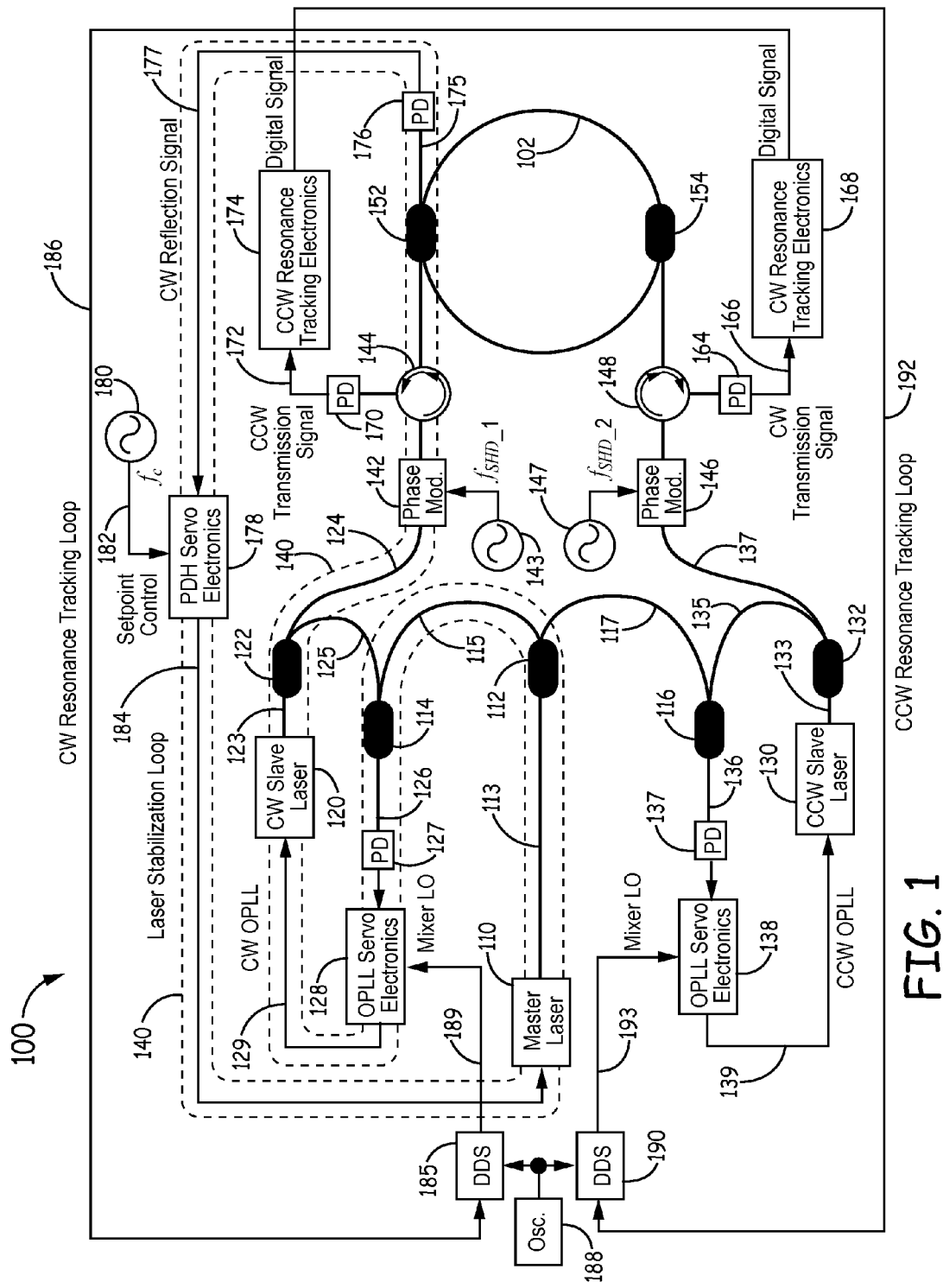
FIG. 1 is a schematic block diagram of a resonator fiber optic gyroscope (RFOG) according to one embodiment.

FIG. 1 illustrates a three-laser RFOG 100 according to one embodiment. The RFOG 100 generally includes an optical resonator ring cavity 102, a master laser 110, a first slave laser 120, and a second slave laser 130. In one embodiment, resonator ring cavity 102 can include a fiber optic coil, with one or more optical couplers, that is wound around a core and about an axis around which rotation is sensed. In general, the slave lasers 120 and 130 are in optical communication with resonator ring cavity 102. The master laser 110 is indirectly locked onto a resonance frequency of resonator ring cavity 102 via slave laser 120 through a feedback laser stabilization loop 140.

In one embodiment, master laser 110 is configured to generate a reference optical signal that is directed to a first optical coupler 112 through an optical fiber 113. The optical coupler 112 directs a first portion of the reference optical signal to a second optical coupler 114 through an optical fiber 115. The optical coupler 112 also directs a second portion of the reference optical signal to a third optical coupler 116 through an optical fiber 117.

The first slave laser 120 is configured to generate a clockwise (CW) optical signal that is directed to a fourth optical coupler 122 through an optical fiber 123. The optical coupler 122 directs a first portion of the CW optical signal to optical coupler 114 through an optical fiber 125. The optical coupler 114 combines the first portion of the CW optical signal with the first portion of the reference optical signal. This combined optical signal is transmitted through an optical fiber 126 to a photodetector (PD) 127 such as a photodiode, which converts the combined optical signal to an electrical signal. This electrical signal is transmitted to an optical phase lock loop (OPLL) servo electronics module 128. An output signal 129 from OPPL servo electronics module 128 is directed to an input of slave laser 120 as part of a CW OPLL for tuning the relative optical frequency between the CW optical signal and the reference optical signal.

The optical coupler 122 also directs a second portion of the CW optical signal to resonator ring cavity 102 through an optical fiber 124. In one embodiment, optical fiber 124 is coupled to a first optical phase modulator 142 located along the optical path between optical coupler 122 and ring cavity 102. The phase modulator 142 is configured to modulate the CW optical signal with a sideband heterodyne (SHD) modulation scheme. A sine wave generator 143 provides a first SHD modulation frequency ($f_{SHD\_1}$) to phase modulator 142. In addition, a first optical circulator 144 is located along the optical path between phase modulator 142 and ring cavity 102. A fifth optical coupler 152 is configured to couple a portion of the CW optical signal into ring cavity 102.

The second slave laser 130 is configured to generate a counter-clockwise (CCW) optical signal that is directed to a sixth optical coupler 132 through an optical fiber 133. The optical coupler 132 directs a first portion of the CCW optical signal to optical coupler 116 through an optical fiber 135. The optical coupler 116 combines the first portion of the CCW optical signal with the second portion of the reference optical signal from master laser 110. This combined optical signal is transmitted through an optical fiber 136 to a photodetector 137, which converts the combined optical signal to an electrical signal. This electrical signal is transmitted to an OPLL servo electronics module 138. An output signal 139 from OPLL servo electronics module 138 is directed to an input of slave laser 130 as part of a CCW OPLL for tuning the relative optical frequency between the CCW optical signal and the reference optical signal.

The optical coupler 132 also directs a second portion of the CCW optical signal to resonator ring cavity 102 through an optical fiber 137. In one embodiment, optical fiber 137 is coupled to a second optical phase modulator 146 located along the optical path between optical coupler 132 and ring cavity 102. The phase modulator 146 is configured to modulate the CCW optical signal with an SHD modulation scheme. A sine wave generator 147 provides a second SHD modulation frequency ($f_{SHD\_2}$) to phase modulator 146. In addition, a second optical circulator 148 is located along the optical path between phase modulator 146 and ring cavity 102.

A seventh optical coupler 154 is configured to couple a portion of the CCW optical signal into ring cavity 102. The optical coupler 154 is also configured to send the CW optical signal from ring cavity 102 to circulator 148, which directs the CW optical signal to a photodetector 164. The photodetector 164 converts the CW optical signal to an electrical CW transmission signal 166 that is sent to a CW resonance tracking electronics module 168.

Returning to optical coupler 152 in ring cavity 102, optical coupler 152 is configured to send the CCW optical signal from ring cavity 102 to circulator 144, which directs the CCW optical signal to a photodetector 170. The photodetector 170 converts the CCW optical signal to an electrical CCW transmission signal 172 that is sent to a CCW resonance tracking electronics module 174.

The SHD modulations from phase modulators 142 and 146 respectively provide unique signatures on each of the CW optical signal and the CCW optical signal. This allows the CW and CCW resonance tracking electronics to separate out the various optical signals that reach photodetectors 164, 170, as well as detect and process signals from only the desired beams.

The optical coupler 152 is also configured to send the CW optical signal reflected from ring cavity 102 through a reflection port, such as an optical fiber 175, to a photodetector 176.

An electrical CW reflection signal 177 is transmitted from photodetector 176 to a Pound-Drever-Hall (PDH) servo electronics module 178. A common modulation is applied to PDH servo electronics module 178, such as from a sine wave generator 180, which sends a common modulation frequency ($f_c$) as a setpoint control signal 182 to PDH servo electronics module 178. An output signal 184 from PDH servo electronics module 178 is transmitted to an input of master laser 110 as part of the laser stabilization loop 140.

The PDH servo electronics demodulate the CW reflection signal at the SHD modulation frequency to provide a resonance tracking error signal that indicates when the optical frequency of slave laser 120 has deviated from the resonance frequency of ring cavity 102. Since slave laser 120 is phase locked onto master laser 110, the resonance tracking error signal also indicates optical frequency changes in master laser 110. The optical frequency of master laser 110 is locked to a resonance of ring cavity 102 with some fixed frequency offset determined by the relative frequency between slave 120 and master laser 110.

A digital signal is output from CW resonance tracking electronics module 168 and sent to a direct digital synthesizer (DDS) 185 as part of a CW resonance tracking loop 186. The DDS 185 also receives a signal from a local oscillator 188. A mixer local oscillator (LO) signal 189 is output from DDS 185 and sent to OPLL servo electronics module 128, which is coupled to CW slave laser 120. The CW resonance tracking loop 186 provides a feedback for slave laser 120 to lock its frequency to the CW resonance of ring cavity 102 by changing the relative optical frequency between slave laser 120 and the master laser 110.

Likewise, a digital signal is output from CCW resonance tracking electronics module 174 and sent to a DDS 190 as part of a CCW resonance tracking loop 192. The DDS 190 also receives a signal from local oscillator 188. A mixer LO signal 193 is output from DDS 190 and sent to OPLL servo electronics module 138, which is coupled to CCW slave laser 130. The CCW resonance tracking loop 192 provides a feedback for slave laser 130 to lock its frequency to the CCW resonance of ring cavity 10 by changing the relative optical frequency between slave laser 130 and the master laser 110.

During operation of RFOG 100, master laser 110 is indirectly locked onto the resonance of ring cavity 102 via slave laser 120 through laser stabilization loop 140. This allows the beam from master laser 110 to not be propagated through ring cavity 102, thereby reducing or eliminating the drawbacks associated with co-propagating laser beams. Output signals from resonance tracking electronics modules 168 and 174 can be processed by a central control unit (not shown) to determine the CW and CCW resonance frequency difference so that rotation rates can be measured.

It should be understood that the various optical couplers employed in RFOG 100 can be replaced with other optical components that perform similar functions, such as mirrors that partially reflect and partially transmit light, beam combiners, beam splitters, or other like devices.

In an alternative embodiment of RFOG 100, laser stabilization loop 140 can be configured to pass through CCW slave laser 130 instead of CW slave laser 120. This alternative embodiment includes essentially the same components as RFOG 100, except that optical coupler 154 is configured to send the CCW optical signal reflected from ring cavity 102 to photodetector 176, which converts the CCW reflection signal to an electrical signal that is transmitted to PDH servo electronics module 178.

In another alternative embodiment of RFOG 100, the common modulation frequency can be applied directly to DDS 185 or DDS 190, instead of to PDH servo electronics module 178. In this embodiment, DDS 185 or DDS 190 takes a digital word that is a DDS frequency command, and outputs a radio frequency (RF) signal at the commanded frequency. The common modulation frequency is generated digitally and added to the DDS frequency commands.

Figure 2:
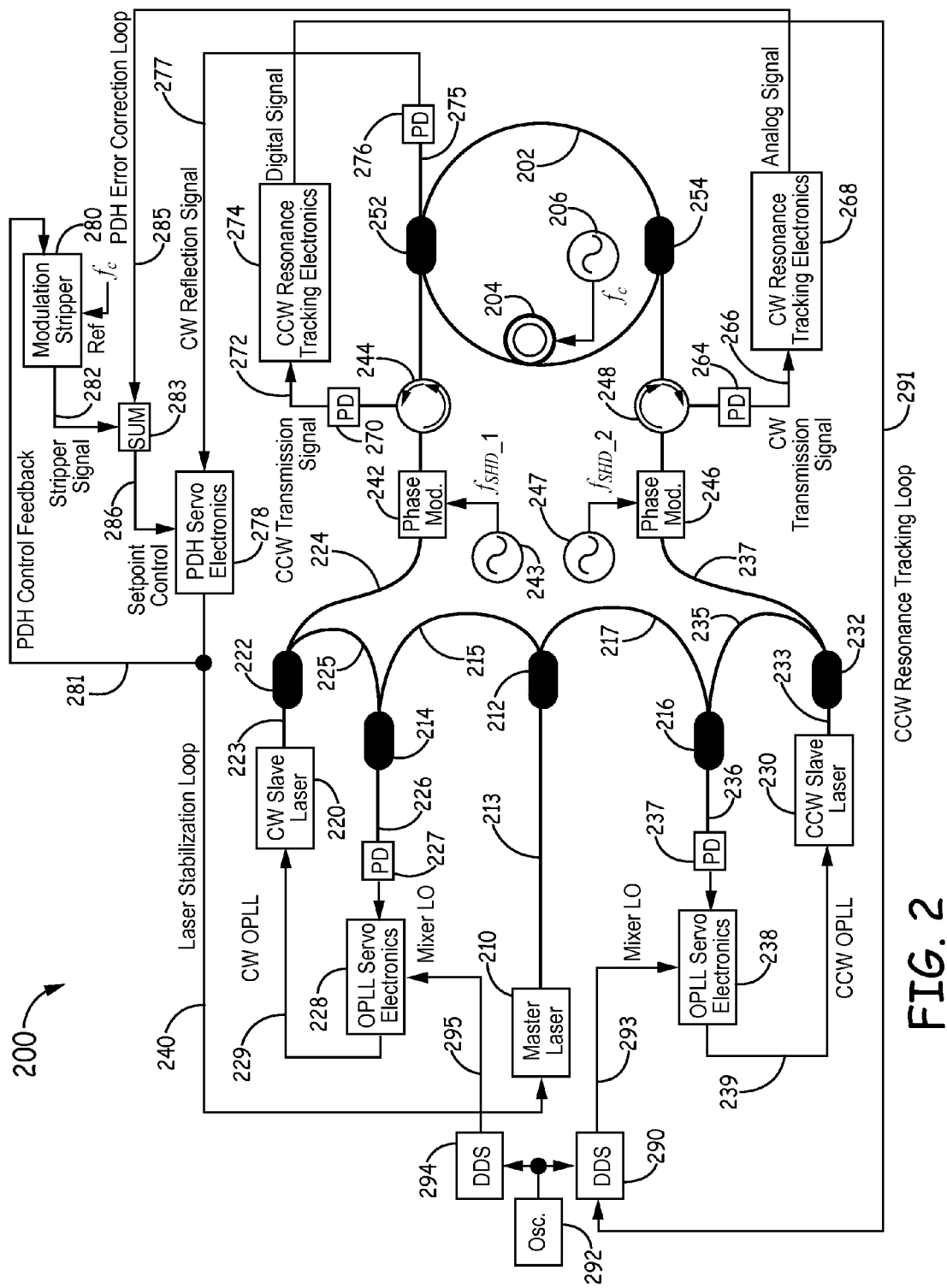
FIG. 2 is a schematic block diagram of an RFOG according to another embodiment.

FIG. 2 illustrates a three-laser RFOG 200 according to another embodiment. The RFOG 200 generally includes an optical resonator ring cavity 202, a master laser 210, a first slave laser 220, and a second slave laser 230. In general, slave lasers 220 and 230 are in optical communication with resonator ring cavity 220. The master laser 210 is indirectly locked onto a resonance frequency of resonator ring cavity 202 via slave laser 220 through a feedback laser stabilization loop 240.

A common cavity modulation scheme can be applied to resonator ring cavity 202, such as with a piezoelectric (e.g., lead zirconate titanate, PZT) transducer wound with optical fiber to form a phase modulator 204. In one embodiment, a sine wave generator 206 provides a common cavity modulation frequency ($f_c$) to phase modulator 204.

The master laser 210 is configured to generate a reference optical signal that is directed to a first optical coupler 212 through an optical fiber 213. The first optical coupler 212 directs a first portion of the reference optical signal to a second optical coupler 214 through an optical fiber 215. The first optical coupler 212 also directs a second portion of the reference optical signal to a third optical coupler 216 through an optical fiber 217.

The first slave laser 220 is configured to generate a CW optical signal that is directed to a fourth optical coupler 222 through an optical fiber 223. The optical coupler 222 directs a first portion of the CW optical signal to optical coupler 214 through an optical fiber 225. The optical coupler 214 combines the first portion of the CW optical signal with the first portion of the reference optical signal. This combined optical signal is transmitted through an optical fiber 226 to a photodetector 227, which converts the combined optical signals to an electrical signal. This electrical signal is sent to an OPLL servo electronics module 228. An output signal 229 from OPPL servo electronics module 228 is directed to an input of slave laser 220 as part of a CW OPLL for frequency tuning of the CW optical signal.

The optical coupler 222 also directs a second portion of the CW optical signal to ring cavity 202 through an optical fiber 224. In one embodiment, optical fiber 224 is coupled to a first optical phase modulator 242 located along the optical path between optical coupler 222 and ring cavity 202. The phase modulator 242 is configured to modulate the CW optical signal with an SHD modulation scheme. In one embodiment, a CW sine wave generator 243 provides a first SHD modulation frequency ($f_{SHD\_1}$) to phase modulator 242. In addition, a first optical circulator 244 is located along the optical path between phase modulator 242 and ring cavity 202. A fifth optical coupler 252 is configured to couple the CW optical signal into ring cavity 202.

The second slave laser 230 is configured to generate a CCW optical signal that is directed to a sixth optical coupler 232 through an optical fiber 233. The optical coupler 232 directs a first portion of the CCW optical signal to optical coupler 216 through an optical fiber 235. The optical coupler 216 combines the first portion of the CCW optical signal with the second portion of the reference optical signal from master laser 210. This combined optical signal is transmitted through an optical fiber 236 to a photodetector 237, which converts the combined optical signal to an electrical signal. This electrical signal is transmitted to an OPLL servo electronics module 238. An output signal 239 from OPLL servo electronics module 238 is directed to an input of slave laser 230 as part of a CW OPLL for frequency tuning of the CCW optical signal.

The optical coupler 232 also directs a second portion of the CCW optical signal to ring cavity 202 through an optical fiber 237. In one embodiment, optical fiber 237 is coupled to a second optical phase modulator 246 located along the optical path between optical coupler 232 and ring cavity 202. The phase modulator 246 is configured to modulate the CCW optical signal an SHD modulation scheme. In one embodiment, a CW sine wave generator 247 provides a second SHD modulation frequency ($f_{SHD\_2}$) to phase modulator 246. In addition, a second optical circulator 248 is located along the optical path between phase modulator 246 and ring cavity 202.

A seventh optical coupler 254 is configured to couple the CCW optical signal into ring cavity 202. The optical coupler 254 is also configured to send the CW optical signal from ring cavity 202 to circulator 248, which directs the CW optical signal to a photodetector 264. The photodetector 264 converts the CW optical signal to an electrical CW transmission signal 266 that is sent to a CW resonance tracking electronics module 268.

Returning to optical coupler 252 in ring cavity 202, optical coupler 252 is configured to send the CCW optical signal from ring cavity 202 to circulator 244, which directs the CCW optical signal to a photodetector 270. The photodetector 270 converts the CCW optical signal to an electrical CCW transmission signal 272 that is sent to a CCW resonance tracking electronics module 274.

The SHD modulations from phase modulators 242 and 246 respectively provide unique signatures on each of the CW optical signal and the CCW optical signal. This allows the CW and CCW resonance tracking electronics to separate out the various optical signals that reach photodetectors 264, 270, as well as detect and process signals from only the desired beams.

The optical coupler 252 is also configured to direct the CW optical signal reflected from ring cavity 202 through an optical fiber 275 to a photodetector 276. An electrical CW reflection signal 277 is transmitted from photodetector 276 to a PDH servo electronics module 278. An output signal 279 from PDH servo electronics module 278 is transmitted to a modulation stripper 280 as part of a PDH control feedback loop 281. The modulation stripper 280 receives a reference common cavity modulation frequency ($f_c$), and transmits a stripper signal 282 to a summer 283. The summer 283 also receives an analog signal output from CW resonance tracking electronics module 268 as part of a PDH error correction loop 285. The summer 283 combines the analog signal with stripper signal 282, and outputs a setpoint control signal 286 to PDH servo electronics module 278. The output signal 279 from PDH servo electronics module 278 is also sent to an input of master laser 210 as part of laser stabilization loop 240 for master laser 210. In this way, the modulation is stripped out of the laser stabilization loop 240 feedback signal so that there can be a net modulation between the resonance frequency of the resonator and the frequencies of the slave lasers, yet unwanted frequency noise and drift between the slave lasers and the resonator are reduced by the gain of the loop.

The PDH servo electronics demodulate the CW reflection signal at the SHD modulation to provide a resonance tracking error signal that indicates when the optical frequency of slave laser 220 has deviated from the resonance frequency of ring cavity 202. Since slave laser 220 is phase locked onto master laser 210, the resonance tracking error signal also indicates optical frequency changes in master laser 210. The optical frequency of master laser 210 is locked to a resonance of ring cavity 202 with some fixed frequency offset determined by the relative frequency between slave 220 and master laser 210.

A digital signal is output from CCW resonance tracking electronics module 274 and sent to a first DDS 290 as part of a CCW resonance tracking loop 291. The DDS 290 also receives a signal from a local oscillator 292. A mixer LO signal 293 is output from DDS 290 and sent to OPLL servo electronics module 238, which is coupled to slave laser 230. The CCW resonance tracking loop 291 provides a feedback for slave laser 230 to lock its frequency to the CCW resonance of ring cavity 202. A second DDS 294 also receives a signal from local oscillator 292. A mixer LO signal 295 is output from DDS 294 and sent to OPLL servo electronics module 228 coupled to slave laser 220.

During operation of RFOG 200, master laser 210 is indirectly locked onto the resonance of ring cavity 202 via slave laser 220 through laser stabilization loop 240. This allows the beam from master laser 210 to not be propagated through ring cavity 202, thereby reducing or eliminating the drawbacks associated with co-propagating laser beams.

In an alternative embodiment of RFOG 200, laser stabilization loop 240 can be configured to pass through CCW slave laser 230 instead of CW slave laser 220. This alternative embodiment includes essentially the same components as RFOG 200, except that optical coupler 254 is configured to send the CCW optical signal reflected from ring cavity 202 to photodetector 276, which converts the CCW reflection signal to an electrical signal that is transmitted to PDH servo electronics module 278. In addition, summer 283 receives an analog signal output from CCW resonance tracking electronics module 274.

Example Embodiments

Example 1 includes a resonator fiber optic gyroscope (RFOG), comprising: a master laser configured to emit a reference optical signal; a first slave laser configured to emit a clockwise (CW) optical signal, the first slave laser operatively coupled to the master laser and responsive to the reference optical signal through a CW optical phase lock loop; a second slave laser configured to emit a counter-clockwise (CCW) optical signal, the second slave laser operatively coupled to the master laser and responsive to the reference optical signal through a CCW optical phase lock loop; and an optical resonator ring cavity in optical communication with the first slave laser and the second slave laser, the optical resonator ring cavity configured to receive the CW optical signal and the CCW optical signal without receiving the reference optical signal. A reflected optical signal from the resonator ring cavity is directed to a feedback laser stabilization loop for the master laser that includes a common modulation frequency scheme. A frequency of the reference optical signal from the master laser is indirectly locked onto a resonance frequency of the resonator ring cavity with a fixed frequency offset, which is determined by a relative frequency between the optical signal of the first slave laser or the second slave laser, and the reference optical signal of the master laser.

Example 2 includes the RFOG of Example 1, further comprising a Pound-Drever-Hall (PDH) servo electronics module configured to demodulate the reflected optical signal using a sideband heterodyne modulation frequency to provide a resonance tracking error signal that indicates when a frequency of the CW optical signal or the CCW optical signal has deviated from a resonance frequency of the resonator ring cavity.

Example 3 includes the RFOG of Example 2, wherein the PDH servo electronics module receives a set point control signal comprising a common modulation frequency from a sine wave generator.

Example 4 includes the RFOG of Example 3, wherein an output signal from the PDH servo electronics module is sent to an input of the master laser as part of the feedback laser stabilization loop.

Example 5 includes the RFOG of any of Examples 1-4, wherein the reflected optical signal is a CW reflection signal from the first slave laser.

Example 6 includes the RFOG of any of Examples 1-4, wherein the reflected optical signal is a CCW reflection signal from the second slave laser.

Example 7 includes the RFOG of any of Examples 1-6, wherein a portion of the CW optical signal and a portion of the reference optical signal are combined in the CW optical phase lock loop for the first slave laser to provide tuning of a relative optical frequency between the CW optical signal and the reference optical signal, wherein the CW optical phase lock loop is part of the feedback laser stabilization loop for the master laser.

Example 8 includes the RFOG of any of Examples 1-6, wherein a portion of the CCW optical signal and a portion of the reference optical signal are combined in the CCW optical phase lock loop for the second slave laser to provide tuning of a relative optical frequency between the CCW optical signal and the reference optical signal, wherein the CCW optical phase lock loop is part of the feedback laser stabilization loop for the master laser.

Example 9 includes the RFOG of any of Examples 2-8, wherein the resonator ring cavity is operatively coupled to a CW resonance tracking electronics module, and a CCW resonance tracking electronics module.

Example 10 includes the RFOG of Example 9, wherein a digital signal is output from the CW resonance tracking electronics module and sent to a first direct digital synthesizer as part of a CW resonance tracking loop.

Example 11 includes the RFOG of Example 10, wherein a digital signal is output from the CCW resonance tracking electronics module and sent to a second direct digital synthesizer as part of a CCW resonance tracking loop.

Example 12 includes the RFOG of any of Examples 10-11, wherein the first direct digital synthesizer receives a common modulation frequency that is digitally generated.

Example 13 includes the RFOG of any of Examples 11-12, wherein the second direct digital synthesizer receives a common modulation frequency that is digitally generated.

Example 14 includes the RFOG of Example 9, wherein an output signal from the PDH servo electronics module is transmitted to a modulation stripper in a PDH control feedback loop.

Example 15 includes the RFOG of Example 14, wherein the modulation stripper receives a reference frequency and transmits a stripper signal to a summer.

Example 16 includes the RFOG of Example 15, wherein the summer is configured to receive an analog signal output from the CW resonance tracking electronics module or the CCW resonance tracking electronics module, combine the analog signal with the stripper signal, and output a setpoint control signal to the PDH servo electronics module.

Example 17 includes the RFOG of Example 16, wherein the output signal from the PDH servo electronics module is also sent to an input of the master laser as part of the feedback laser stabilization loop for the master laser.

Example 18 includes a resonator fiber optic gyroscope (RFOG), comprising: a master laser that emits a reference optical signal; a first slave laser that emits a CW optical signal, the first slave laser operatively coupled to the master laser and responsive to the reference optical signal through a CW optical phase lock loop; a second slave laser that emits a CCW optical signal, the second slave laser operatively coupled to the master laser and responsive to the reference optical signal through a CCW optical phase lock loop; an optical resonator ring cavity in optical communication with the first slave laser and the second slave laser, the resonator optical ring cavity configured to receive the CW optical signal and the CCW optical signal without receiving the reference optical signal; a piezoelectric phase modulator operatively coupled to the resonator ring cavity and configured to provide a common cavity modulation for the resonator ring cavity; a CW resonance tracking electronics module operatively coupled to the resonator optical ring cavity; a CCW resonance tracking electronics module operatively coupled to the resonator optical ring cavity; a photodetector that converts a reflected optical signal from the resonator optical ring cavity to an electrical signal; and a feedback laser stabilization loop for the master laser. The feedback laser stabilization loop comprises: a Pound-Drever-Hall (PDH) servo electronics module configured to receive the electrical signal from the photodetector; a modulation stripper responsive to an output signal from the PDH servo electronics module in a PDH control feedback loop; a summer configured to receive a stripper signal from the modulation stripper, receive an analog signal output from the CW resonance tracking electronics module or the CCW resonance tracking electronics module as part of a PDH error correction loop, combine the stripper signal with the analog signal, and output a setpoint control signal to the PDH servo electronics module. The output signal from the PDH servo electronics module is transmitted to an input of the master laser. A frequency of the reference optical signal from the master laser is indirectly locked onto a resonance frequency of the resonator ring cavity with a fixed frequency offset, which is determined by a relative frequency between the optical signal of the first slave laser or the second slave laser, and the reference optical signal of the master laser.

Example 19 includes the RFOG of Example 18, wherein the reflected optical signal comprises a CW reflection signal of the CW optical signal from the first slave laser.

Example 20 includes the RFOG of Example 19, wherein the PDH servo electronics module demodulates the CW reflection signal using a sideband heterodyne modulation frequency to provide a resonance tracking error signal that indicates when a frequency of the CW optical signal has deviated from a resonance frequency of the resonator ring cavity.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A resonator fiber optic gyroscope (RFOG), comprising:
   a master laser configured to emit a reference optical signal;
   a first slave laser configured to emit a clockwise (CW) optical signal, the first slave laser operatively coupled to the master laser and responsive to the reference optical signal through a CW optical phase lock loop;
   a second slave laser configured to emit a counter-clockwise (CCW) optical signal, the second slave laser operatively coupled to the master laser and responsive to the reference optical signal through a CCW optical phase lock loop; and
   an optical resonator ring cavity in optical communication with the first slave laser and the second slave laser, the resonator ring cavity configured to receive the CW optical signal and the CCW optical signal, the resonator ring cavity not optically connected to the master laser such that the resonator ring cavity does not receive the reference optical signal;
   a feedback laser stabilization loop for the master laser that includes a common modulation frequency scheme, wherein a reflected optical signal from the resonator ring cavity is directed to the feedback laser stabilization loop;
   wherein a frequency of the reference optical signal from the master laser is indirectly locked onto a resonance frequency of the resonator ring cavity with a fixed frequency offset, which is determined by a relative frequency between the optical signal of the first slave laser or the second slave laser, and the reference optical signal of the master laser.

2. The RFOG of claim 1, further comprising a Pound-Drever-Hall (PDH) servo electronics module configured to demodulate the reflected optical signal using a sideband heterodyne modulation frequency to provide a resonance tracking error signal that indicates when a frequency of the CW optical signal or the CCW optical signal has deviated from a resonance frequency of the resonator ring cavity.

3. The RFOG of claim 2, wherein the PDH servo electronics module receives a set point control signal comprising a common modulation frequency from a sine wave generator.

4. The RFOG of claim 3, wherein an output signal from the PDH servo electronics module is sent to an input of the master laser as part of the feedback laser stabilization loop.

5. The RFOG of claim 1, wherein the reflected optical signal is a CW reflection signal from the first slave laser.

6. The RFOG of claim 1, wherein the reflected optical signal is a CCW reflection signal from the second slave laser.

7. The RFOG of claim 1, wherein a portion of the CW optical signal and a portion of the reference optical signal are combined in the CW optical phase lock loop for the first slave laser to provide tuning of a relative optical frequency between the CW optical signal and the reference optical signal, wherein the CW optical phase lock loop is part of the feedback laser stabilization loop for the master laser.

8. The RFOG of claim 1, wherein a portion of the CCW optical signal and a portion of the reference optical signal are combined in the CCW optical phase lock loop for the second slave laser to provide tuning of a relative optical frequency between the CCW optical signal and the reference optical signal, wherein the CCW optical phase lock loop is part of the feedback laser stabilization loop for the master laser.

9. The RFOG of claim 2, wherein the resonator ring cavity is operatively coupled to a CW resonance tracking electronics module, and a CCW resonance tracking electronics module.

10. The RFOG of claim 9, wherein a digital signal is output from the CW resonance tracking electronics module and sent to a first direct digital synthesizer as part of a CW resonance tracking loop.

11. The RFOG of claim 10, wherein a digital signal is output from the CCW resonance tracking electronics module and sent to a second direct digital synthesizer as part of a CCW resonance tracking loop.

12. The RFOG of claim 10, wherein the first direct digital synthesizer receives a common modulation frequency that is digitally generated.

13. The RFOG of claim 11, wherein the second direct digital synthesizer receives a common modulation frequency that is digitally generated.

14. The RFOG of claim 9, wherein an output signal from the PDH servo electronics module is transmitted to a modulation stripper in a PDH control feedback loop.

15. The RFOG of claim 14, wherein the modulation stripper receives a reference frequency and transmits a stripper signal to a summer.

16. The RFOG of claim 15, wherein the summer is configured to:
receive an analog signal output from the CW resonance tracking electronics module or the CCW resonance tracking electronics module;
combine the analog signal with the stripper signal; and
output a setpoint control signal to the PDH servo electronics module.

17. The RFOG of claim 16, wherein the output signal from the PDH servo electronics module is also sent to an input of the master laser as part of the feedback laser stabilization loop for the master laser.

18. A resonator fiber optic gyroscope (RFOG), comprising:
a master laser that emits a reference optical signal;
a first slave laser that emits a clockwise (CW) optical signal, the first slave laser operatively coupled to the master laser and responsive to the reference optical signal through a CW optical phase lock loop;
a second slave laser that emits a counter-clockwise (CCW) optical signal, the second slave laser operatively coupled to the master laser and responsive to the reference optical signal through a CCW optical phase lock loop;
an optical resonator ring cavity in optical communication with the first slave laser and the second slave laser, the resonator ring cavity configured to receive the CW optical signal and the CCW optical signal without receiving the reference optical signal;
a piezoelectric phase modulator operatively coupled to the resonator ring cavity and configured to provide a common cavity modulation for the resonator ring cavity;
a CW resonance tracking electronics module operatively coupled to the resonator ring cavity;
a CCW resonance tracking electronics module operatively coupled to the resonator ring cavity;
a photodetector that converts a reflected optical signal from the resonator ring cavity to an electrical signal; and
a feedback laser stabilization loop for the master laser, the feedback laser stabilization loop comprising:
a Pound-Drever-Hall (PDH) servo electronics module configured to receive the electrical signal from the photodetector;
a modulation stripper responsive to an output signal from the PDH servo electronics module in a PDH control feedback loop;
a summer configured to:
receive a stripper signal from the modulation stripper;
receive an analog signal output from the CW resonance tracking electronics module or the CCW resonance tracking electronics module as part of a PDH error correction loop;
combine the stripper signal with the analog signal; and
output a setpoint control signal to the PDH servo electronics module;
wherein the output signal from the PDH servo electronics module is transmitted to an input of the master laser;
wherein a frequency of the reference optical signal from the master laser is indirectly locked onto a resonance frequency of the resonator ring cavity with a fixed frequency offset, which is determined by a relative frequency between the optical signal of the first slave laser or the second slave laser, and the reference optical signal of the master laser.

19. The RFOG of claim 18, wherein the reflected optical signal comprises a CW reflection signal of the CW optical signal from the first slave laser.

20. The RFOG of claim 19, wherein the PDH servo electronics module demodulates the CW reflection signal using a sideband heterodyne modulation frequency to provide a resonance tracking error signal that indicates when a frequency of the CW optical signal has deviated from a resonance frequency of the resonator ring cavity.

* * * * *